Nov. 28, 1967  L. GREGORY, JR  3,355,102
SEED PLANTER FEEDING INDICATOR AND COUNTING
MECHANISM AND CIRCUIT CONTROL DEVICE
Filed Sept. 13, 1965  2 Sheets-Sheet 1
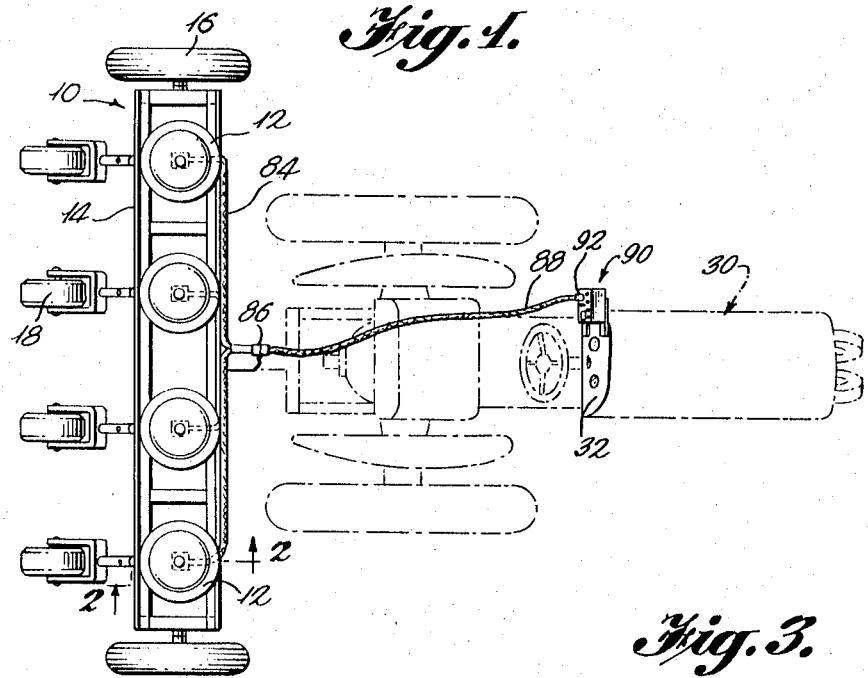
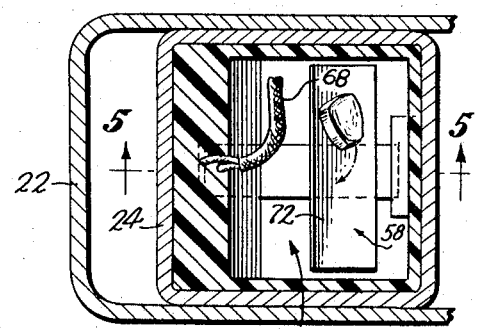
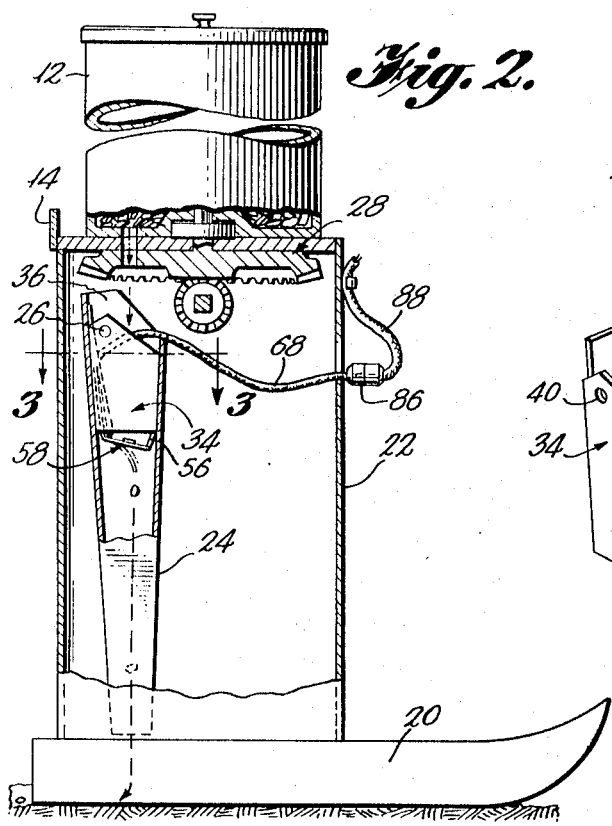
INVENTOR
Lester Gregory, Jr.
BY
Shoemaker and Mattare
ATTORNEYS Nov. 28, 1967  L. GREGORY, JR  3,355,102
SEED PLANTER FEEDING INDICATOR AND COUNTING
MECHANISM AND CIRCUIT CONTROL DEVICE
Filed Sept. 13, 1965  2 Sheets-Sheet 2

INVENTOR
Lester Gregory, Jr.

BY
Shoemaker and Mattare
ATTORNEYS 3,355,102
SEED PLANTER FEEDING INDICATOR AND COUNTING MECHANISM AND CIRCUIT CONTROL DEVICE
Lester Gregory, Jr., Yellville, Ark., assignor to Calark, Inc., Yellville, Ark., a corporation of Arkansas
Filed Sept. 13, 1965, Ser. No. 486,938
14 Claims. (Cl. 235—98)

This invention relates generally to seed planting machines.

More particularly, the invention is directed to improvements in the seed discharge or feeding means of seed planter machines and especially to the part of the planter known as the feed chute into which seeds are dropped from the seed feeding mechanism for passage downwardly to the ground.

In the planting of grain such as corn, or other seeds, the seed planting machine has a seed feeding mechanism by means of which the seed is fed from a hopper at a set rate with respect to the speed of movement of the planter over the ground. Thus the machine upon traveling a predetermined distance would be expected to deposit a known number of seeds into a furrow or onto the ground at a predetermined or known spacing. Thus, in the operation of a planter for planting corn, for example, a planter machine may be adjusted for planting a population of 22,000 seeds to an acre of ground in which case the corn should be deposited at a spacing of approximately 7 inches for every 131 feet of travel of the machine, thereby depositing approximately 220 seeds in that distance. One of the difficulties encountered in such planting is that the operator of the planter or of a tractor drawing the planter cannot watch and see the individual seeds deposited in the row and thus it is customary to look back to see when seeds are being deposited in the row. If for any reason the flow of seeds from the hopper of the machine is interrupted and there is no rider to see whether the seeds are being deposited, then the operator of the machine may travel for a considerable distance before he discovers that no seeds are being planted and he then has to retrace his path. Also, the operator of the machine or the rider has no way of detecting how many seeds are deposited in a given distance as, for example, in a distance of 131 feet of travel of the machine. If the feeding mechanism which permits the seeds to flow from the hopper into the feed chute is not set for discharging the desired number of seeds, more or less than the required number within a specified distance may be put down. Accordingly, the only way the planter can determine if the right number of seeds are being deposited at the proper spacing and to determine if any seeds at all are being planted is to run a row for a known or measured distance and then go back and dig up the seeds to see if they are properly placed or properly spaced or to run a row on an open or bare roadway where he can see the seeds deposited and can see whether the spacing between the seeds is the desired number in a row of a specified length.

In view of the foregoing it is a particular object of the present invention to provide a novel mechanism for attachment to or for use in connection with a seed planter, by means of which the difficulties and annoyances as above set forth associated with the planting of seeds as at present practiced, are eliminated.

It is another object of the present invention to provide a novel mechanism for use in connection with conventional seed planter machines which will indicate to an operator of the planter and without requiring the presence of a second person or rider, whether or not seeds are being dispensed from the planter or, in other words, whether or not the planter is functioning in the correct manner.

It is still another object of the invention to provide a novel mechanism or apparatus for use on a seed planter machine, which will not only indicate to an operator of the machine whether or not the seed planter is functioning properly, but by means of which the operator of the machine will be informed as to the number of seeds dispensed or deposited by the machine within a given extent of travel.

A still further object of the invention is to provide a mechanism of the character and for the purpose stated which can be easily and quickly installed on a seed planter machine by anyone without mechanical training and in a very few minutes and which is, therefore, foolproof and which, also, has a minimum of moving parts and which will be substantially dust-free.

More particularly, the invention embodies the use of an electric circuit closing unit which is easily and quickly introduced into the seed feeding chute of a seed planter and an electrically operated feeding indicator and counter, connected with the unit and mounted either upon the planter or upon a draft vehicle, for giving a definite signal or indication to the operator of the planter each time a seed descends through the chute to the ground. The feeding indicator and counter not only indicates to the operator each time a seed passes through the chute to the ground, but also registers or counts the passage of each seed so that the operator of the planter will know, when the planter has traveled a prescribed distance, just how many seeds have been deposited.

The indicator and counter is also illuminated with the passage of each seed, or it may be continually illuminated and indicate the passage of each seed by a blink by being momentarily extinguished so that an operator of the seed planter equipped with the invention can plant seeds at night and will receive the required information as to the number of seeds planted and as to the passage of each seed through the seed chute, under conditions of light which would otherwise interfere with or prevent the use of the planter.

The novel circuit closing means installed in the seed feed chute comprises an individual tubular unit which is inserted and frictionally held in the chute, or which may be held in place in any suitable manner in the chute, in a position to have a discharged seed pass therethrough and an extremely flexible switch blade is positioned in the tubular unit, or it may be at the lower end of the tubular unit, which will be flexed by the weight, or force, of a free falling seed striking it, to affect a signal circuit whereby the operation of the seed feeding indicator and counter is caused to take place.

The invention will be best understood from a consideration of the following detailed description taken in connection with the accompanying drawings, wherein:

FIG. 1 is a top plan view of a relatively simplified form or construction of a four-row, pull type seed planter in association with which the present invention is described to be used, the illustrated planter being shown connected to a draft machine such as a tractor, shown in broken lines and illustrating the wire bundle connection between the seed actuated circuit controlling unit and a visual and numerical indicating means mounted upon a portion of the tractor structure such, for example, as the instrument panel.

FIG. 2 is a sectional view taken in a vertical plane substantially on the line 2—2 of FIG. 1 and illustrating a conventional seed feeding mechanism and showing the seed actuated circuit controlling unit mounted in the seed dispensing chute.

FIG. 3 is a horizontal section taken substantially on the line 3—3 of FIG. 2, the view being on an enlarged scale.

FIG. 4 is a perspective view of an embodiment of the circuit controlling unit designed for installation in a seed dispensing chute of rectangular cross section.

Figure 5:
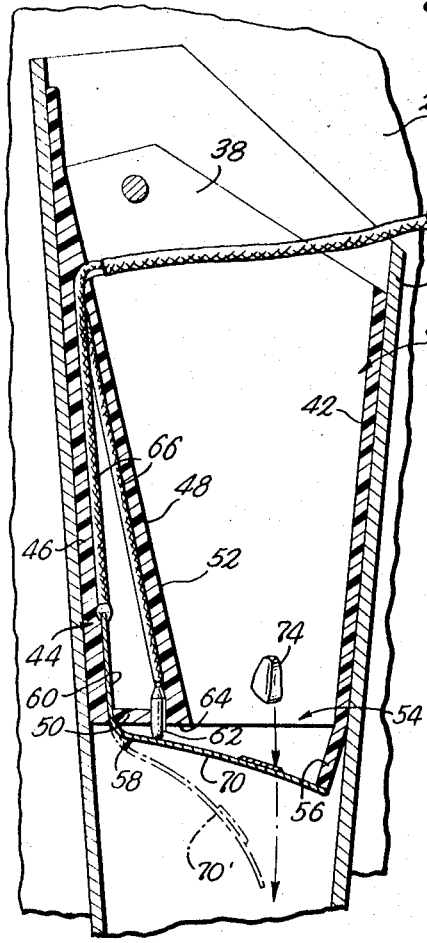
FIG. 5 is a sectional view taken in a vertical plane substantially on the line 5—5 of FIG. 3 and on an enlarged scale.

Referring now more particularly to the drawings, the numeral 10, in FIG. 1, generally designates a seed planter which is illustrated in simplified form. This simplified illustration of the planter may represent any type or make of planter having the hereinafter referred to structural features with which the elements of the present invention may be used. Accordingly, it is understood that in this illustration, which shows in top plan four seed hoppers 12, no limitation of the type of seed planter with which the present invention may be used, is to be understood. The planter shown may represent a four-row, pull type corn planter of the hilldrop and drill type or any other type of planter adapted for the planting of corn, beetroot seed or other seed capable of activating the circuitry of the invention. The invention is also applicable to planters having a greater or lesser number of seed hoppers than here illustrated in the simplified showing.

In the simplified planter structure shown, the numeral 14 generally designates the hopper supporting frame carried by wheels 16 while the numeral 18 designates a a press wheel associated with and trailing each of the hoppers and the furrow openers, such as the opener shown in FIG. 2 and designated 20.

Below each hopper 12 and extending from the frame 14 downwardly to the opener 20, there is illustrated a conventional boot 22. Within the boot is located the seed feeding chute 24 which is supported or suspended by a suitable means, in some instances in certain types of machines, by means of a pin or bolt extending transversely through the boot and through the upper end of the chute as illustrated, such pin here being designated 26.

The numeral 28 generally designates a conventional simplified form of rotary seed feeder by means of which seeds are dropped individually into the upper end of the chute 24 in the manner illustrated. Such seed feeders are generally constructed to feed seeds of different sizes and at different rates. No detailed illustration or description of the seed feeder mechanism, other than that here shown in simplified form, is set forth since the seed feeding mechanism, other than that here shown in simplified form, is set forth since the seed feeding mechanism forms no part in itself of the present invention, but is merely illustrated to show the operative location of the seed actuated circuitry controlling unit with respect thereto.

The numeral 30 generally designates a draft vehicle, such as a tractor, by which the planter machine may be drawn. Such vehicle is here illustrated as having an instrument panel 32 upon which a unit of the present invention may be mounted.

Designed for insertion in the top end of the seed dispensing chute 24 is a switch carrying unit which is generally designated 34. This unit is here illustrated as being substantially square or of rectangular cross-sectional form to conform to the interior configuration of the chute 24. However, the unit 34 may be made in any other cross-sectional configuration to conform to the seed feeding chute in which it may be placed in the event that such chute is of a cross-sectional form other than square or rectangular as here illustrated. The presently illustrated form of chute has the open top shown with the side wings 36 extending from the side walls thereof and apertured to receive the bolt or pin 26 by which the chute is suspended in position and, as illustrated, the chute is of tapering design, the smaller or narrower lower end being disposed in the bottom part of the boot 22 in position to discharge seed into the furrow opened by the opener 20.

The unit 34 is tubular as shown and has elongate form and is open at its ends. Also, the unit 34, in the form here illustrated, has the side walls 38 provided at their upper ends with the openings 40 for the passage of the supporting pin 26 whereby the unit is maintained or may be held stationary in the chute. However, since the unit 34 is of a cross-sectional configuration substantially conforming to the configuration of the interior of the chute 24, it may be dimensioned or made in the proper size to fit and be held in the chute solely by friction.

The numerals 42 and 44 designate walls of the unit 34 which may be defined as the front and back walls thereof. The back wall 44 of the unit is here illustrated as being hollow or double, the numeral 46 designating the rear side thereof while the numeral 48 designates the forward side and, as shown, the two sides of the back wall are connected at the bottom by the horizontal portion 50.

It will also be noted that the forward side 48 of the back wall extends diagonally downwardly through the unit or is downwardly divergent with respect to the rear side 46, thereby providing a downwardly and forwardly facing seed deflecting surface 52 and forming the relatively narrow or small seed passage or opening 54.

The front wall 42 of the unit also carries or is extended to form, the depending inwardly angled tongue or stop 56 for the purpose hereinafter described.

The numeral 58 generally designates an electric switch element carried at the bottom of the unit 34. This element comprises the terminals 60 and 62. These terminals, as shown in FIG. 5, are secured to or in the material of the back wall 44 and extend through and are exposed at the under side or bottom face of the transverse bottom portion of the wall which connects the two sides 46 and 48 thereof. Such bottom face of this part 50 is designated 64.

The terminals 60 and 62 have connected therewith the electric current conducting wires 66 which extend from the terminals upwardly to the top part of the unit 34 from which upper part they emerge and may be assembled in the single cable as illustrated at 68.

The body of the unit 34 is preferably fashioned or molded of a suitable plastic or other moldable material which is non-conductive of electricity. Accordingly, while there has been illustrated the double wall or construction at the back of the unit, it will be seen that the back wall 44 may be made solid if desired with the conductors 66 molded therein.

As shown, the terminal 62 has an end or tip which extends only slightly below the surface or face 64 whereas the terminal 60 is electrically connected to or may form a continuation of an end of the switch blade 70.

The switch blade 70 extends forwardly across the width of the seed passing opening 54 and is of a length whereby the forward or free end thereof will engage the bottom end of the tongue 56 when the switch is closed with the blade 70 in electrical contact with the terminal 62.

The blade 70 may be made of any desired width and in one embodiment thereof, as illustrated in FIGS. 2, 3 and 5, the blade may be provided with a cross arm strip 72 which together with the blade itself will sufficiently cover the opening or outlet 54 to prevent a seed of corn or other seed passing through the unit 34, escaping into the chute 24 without striking and flexing or deflecting the blade 70 to break the electrical connection between the blade and the terminal 62.

The blade 70 is, of course, made of a suitable electric current conducting metal, preferably stainless steel, and has been found to be deflected by a falling seed of the size and weight of an average kernel of corn, so as to effect the opening of the switch, when the metal has a thickness of approximately 1/1000 of an inch and is of a width and length respectively of approximately 1/8 inch and 1 inch. In setting forth these dimensions it is to be understood that these are merely exemplary and there is no intention to limit the invention as it will be readily obvious that the degree of resiliency of the blade may be altered slightly by changing the width and length thereof.

As stated, when the switch 58 is closed so as to have the blade 70 in contact with the terminal 62, the outer end of the blade will be against the tongue 56 with a slight pressure whereby a good contact will be maintained between the blade and the terminal 62. The blade, while being biased to press upwardly against the tongue 56 as shown, will be of such degree of flexibility that the weight of a kernel of corn or other seed of a similar nature, when falling through the unit 34, will cause the blade to flex downwardly as indicated in broken lines at 70', the numeral 74 designating a falling seed in FIGURES 3 and 5.

Figure 6:
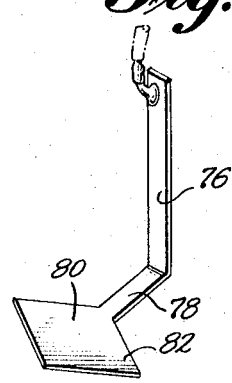
FIG. 6 is a perspective view of another form or design of switch blade.
Figure 7:
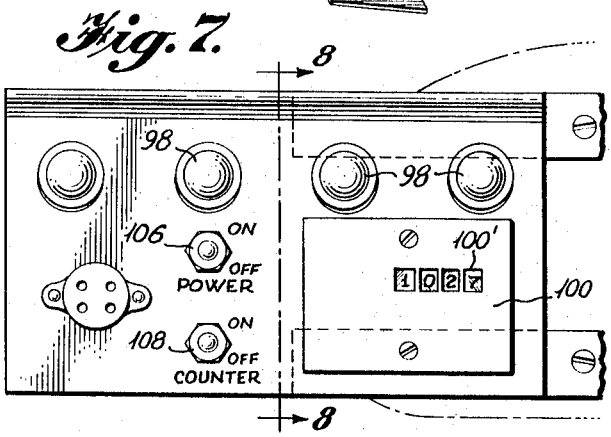
FIG. 7 is a front or face view of the visual and numerical indicating structure.
Figure 8:
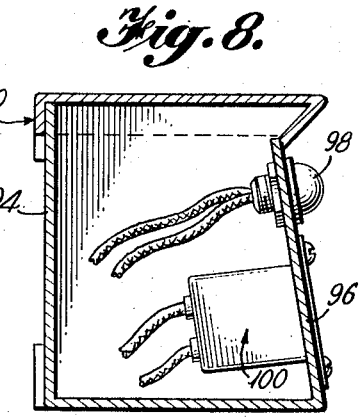
FIG. 8 is a vertical section taken substantially on the line 8—8 of FIG. 7.

Other forms of switch blade may be employed if desired as, for example, the blade shown in FIG. 6 is provided with a widened forward end portion which functions in a similar manner to the transverse arm 72 hereinbefore referred to. In this figure the part of the switch blade structure designated 76 constitutes the terminal which would be embedded in the wall 44 of the unit while the switch blade itself is designated 78 and is of increased width at its forward end by having the diamond shape or contour as indicated at 80, the points 82 of the figure being directed transversely of the portion 78 of the blade. In a construction such as this illustrated in FIG. 6, the body portion 78 of the blade would, of course, be of extremely thin and relatively narrow dimensions so that the desired degree of flexibility would be obtained.

In the employment of a number of the units 34 the electric current conducting wires leading from the switch terminals might be brought together in a single mass to form a wire bundle as indicated at 84, with the individual wires connected to suitable points or terminals in a conventional type of coupler 86 for connecting the individual wires of the several units with the corresponding wires in a bundle 88 which would extend to a visual and numerical indicator unit which might be mounted upon the tractor or other draft vehicle in a position to be observed by a rider on the vehicle and which visual and numerical indicator structure is here designated as a whole by the numeral 90.

The forward end of the wire bundle 88 would also carry suitable coupling means, designated 92, for "plugging-in" the wires into the indicator 90.

The visual and numerical indicator generally designated 90 in the preferred form or construction thereof comprises a housing 94 having a front or face panel 96. This panel is here illustrated as carrying a number of incandescent electric lamps or bulbs, each of which is designated 98, there being one each of these bulbs or lights for each unit 34.

The panel 96 is formed to have mounted thereon a conventional type of electrically actuated counter-unit which is here generally designated 100. A unit of this character is of standard design or make which may be purchased through electrical supply services and such unit is manufactured and sold under the name of "Rowan" counter made by Rowan Controller Company of Red Bank, N.J. This electrically operated counter is operated by electrical impulses or impulses created in an electric circuit in which the counter is connected and when the unit is connected in the circuitry illustrated in FIG. 9 and in which the switches 58 of the units 34 are connected, a count will be made each time the switch 58 is opened and the light 98 in circuit with the switch will be made to flicker.

Figure 9:
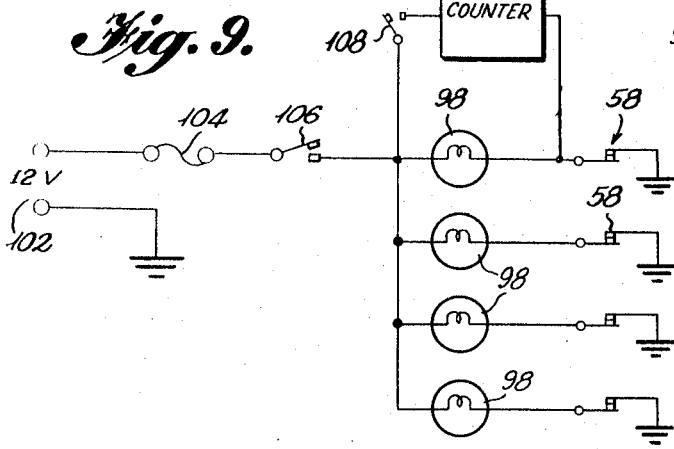
FIG. 9 shows a circuit diagram for the electrical elements employed.

In the circuit illustrated in FIG. 9 it will be seen that the electrically operated counter and one light 98 and one switch 58 are connected in parallel.

Electric current is supplied from the usual storage battery source carried by a tractor or other means, this usually being a 12 volt current source and such source is designated 102 in the circuit diagram figure. In circuit with the battery or current source is a suitable fuse 104 and a main control switch 106.

The numeral 108 designates a second control switch by means of which the counter 100 may be cut out of the circuit.

When the apparatus of the present invention is installed upon a seed planter and draft vehicle in the manner illustrated and described, with the electric circuit connected with the source of electrical potential and with the switches 106 and 108 closed, the opening of the normally closed switch 58, connected in parallel with the counter, will momentarily extinguish the light 98 connected to that particular switch and will create an impulse in the circuit to effect actuation of the counter mechanism 100. Thus only one switch will actuate the counter. In seed planters the seed feeding mechanisms connected with the several seed receptacles operate synchronously so that all of the receptacles will discharge or drop a seed at the same time or substantially simultaneously. Thus in the circuit arrangement such as that shown in FIG. 9 all of the lights will be simultaneously extinguished and will be immediately re-energized as soon as the seeds passing through the units 34 have cleared the switch blades 70 so that the switches 58 return to closed position. Simultaneously with this passage of the seeds through the units 34 and their associated feeder tubes 24, the counter 100 with which one light 98 and switch 58 are in parallel, will be actuated. The number shown at the window 100' of the counter will thus be increased by one indicating that a seed has passed through each of the seed feeding chutes. Failure of any one of the units 34 to pass a seed will be immediately apparent to the rider of the tractor by the failure of a light to blink.

An alternative arrangement to the use of the number of lights illustrated or, in other words, to the use of one light for each switch carrying unit 34, the switches of the several units 34 may all be electrically connected with a single light. Thus the opening of all of the switches simultaneously would cause the single light to blink or if only one or two of the switches 58 opened, the light would fail to blink or would remain on as the current would be conveyed thereto through the other closed switches and as no interruption to the circuit would be caused, the counter would fail to function. Thus the operator would know at once of the failure.

With the mechanism set up for use in the manner described, when the operator of the seeder traverses a field for a distance of 131 feet and the seed feeding mechanism of each hopper has been set to discharge a certain number of seeds for a given number of feet of travel of the machine, the window 100' of the indicator 100 will show the number of seeds discharged in the running distance of 131 feet and if the discharge mechanisms of the hoppers are properly set, the indicator should show the number 220 for the total number of seeds discharged. This would be the proper number also for depositing a population of 22,000 seeds to an acre of ground.

The mechanism of the present invention also enables a planter to sow seed at night as the blinking of the lights associated with the feeding chutes will readily show that seeds are being deposited. Thus, with the present mechanism the farmer or sower of the seeds has a double check on the sowing operation enabling him to detect failure in any one of the seed depositing chutes and also enabling him to know when he has traveled the required number of feet over a field whether or not the correct number of seeds are being discharged and this will also be an indication that where the proper number of seeds are discharged within the specified number of feet, the seeds are being placed at the proper intervals or with the proper spacing.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A seed planting detection and counting mechanism comprising a seed planter having feeding means and a dispensing chute to receive seed from the feeding means, a unit supported within the dispensing chute, said unit being of an interior size to permit seeds to pass therethrough, an electric signal circuitry adapted to be connected with a source of electric potential and including an electrically energized indicator element, and an electric switch structure in said circuitry forming a part of said unit and including a seed actuated blade for opening and closing the signal circuitry.

2. A signal circuit control device comprising a seed planter having feeding means and a dispensing chute of a certain inside geometrical cross-sectional contour positioned to receive seed from the feeding means, a tubular member supported within said dispensing chute and having a geometrical cross-sectional contour to conform to said inside geometrical cross-sectional contour of said seed dispensing chute, a pair of spaced electrical terminals carried by said member, an electric current conducting element movably carried by the tubular member for passing electric current between said terminals, and means whereby movement of said element may be effected by a seed falling freely through said tubular member and engaging said element for making and breaking the path of an electric current flowing between said terminals.

3. A signal circuit control device comprising a seed planter having feeding means and a dispensing chute of a certain inside geometrical cross-sectional contour positioned to receive seed from the feeding means, a tubular member supported within said dispensing chute and having a geometrical cross-sectional contour to conform to said inside geometrical cross-sectional contour of said seed dispensing chute, a pair of spaced electrical terminals carried by said member, a resilient switch blade electrically connected to one of said terminals and biased to tend constantly to move in one direction relative to the other terminal and having a portion positioned to intercept passage of a seed body falling freely through said tubular member, and said switch blade having a resiliency such as to maintain said biasing tendency and to be flexed by and under the force imposed thereon by a freely falling seed and moved in the opposite direction relative to said other terminal.

4. A seed planter having a seed feeding means and a dispensing chute positioned to receive seed from the feeding means, a tubular unit positioned within said dispensing chute to have dispensed seeds pass therethrough, an electric circuitry having a source of electric potential therein, an interrupter in said circuitry including a pair of electric terminals and a resilient electric current conducting blade electrically connected to one terminal and biased to engage the other terminal, said blade being of a highly flexible character, the signal interrupter being carried entirely by said tubular unit and positioned therewith entirely within the dispensing chute with said blade positioned to be in the path of and struck by a seed falling through the unit and flexed by the falling seed to interrupt current flow in the circuitry, an electric current operated visual and numerical indicating means in said circuitry actuated upon interruption of current flow to provide a visual and numerical indication of the passage of a seed through said unit.

5. The invention as defined in claim 4, wherein said unit is adapted to be readily inserted into and removed from said seed dispensing chute.

6. A seed planter having a seed feeding means and a suspended downwardly tapering dispensing chute positioned to receive seed from the feeding means, an elongate tubular unit positioned within said dispensing chute to have dispensed seeds pass therethrough and having a downward taper approximately conforming to the taper of the dispensing chute, means retaining the unit in operative position in the chute, an electric circuit switch means carried by said tubular unit and including one terminal and a flexible switch blade electrically connected thereto and another terminal positioned to be engaged by said blade, the said switch blade being a relatively thin resilient elongate electric current conducting metal body disposed across the lower portion of said tubular unit to be struck and flexed relative to said another terminal by a seed falling freely through the unit, electric current conducter wires electrically connected to said terminals and extending from the unit to the exterior of said chute, an electric current operated visual and numerical indicating means, a source of electric potential, electric current conducting wires connected with said visual and numerical indicating means and with said source of electric potential and with the first said wires to form an operative circuitry, said circuitry being such that the visual and numerical indicating means is made functional upon actuation of said switch blade by a seed falling through the unit.

7. The invention according to claim 6, wherein said unit is secured by friction in the seed dispensing chute.

8. The invention according to claim 6, wherein the said unit and the current conductor wires electrically connected thereto are removable through the top end of the seed conducting chute, with means for detachably coupling the said wires from the said electric current conducting wires connected with the said visual and numerical indicating means.

9. A seed planter having a seed feeding means and an elongate vertically disposed seed dispensing chute positioned to receive seed from said feeding means, an elongate tubular plastic unit supported in the top end of said chute in a position with respect to said feeding means to receive and pass seed downwardly into the underlying part of the chute, said unit having one side wall formed with an inside surface extending longitudinally obliquely downwardly toward and terminating short of the opposite side wall thereby forming a seed opening or outlet at the lower end portion of the unit, said unit having a bottom end surface extending from the bottom end of said inclined inside surface toward the outside surface of the said one side wall, a resilient switch blade attached at one end to the said bottom end surface and extending at its opposite end across said seed opening and adapted to be engaged and flexed downwardly by a seed falling through the unit for discharge through said seed opening, an electric current terminal exposed on said bottom end surface for electrical engagement by said blade, said blade being biased toward and for engagement with said terminal, and electric current conducting wires electrically connected with and leading from said terminal and switch blade respectively for connection in an electric circuitry.

10. The invention as defined by claim 9, wherein said current conducting wires are in part encased in a portion of the unit between said inside surface of said one side wall and the outside surface of the said one side wall.

11. An enlongate tubular unit adapted to be inserted into the top of a seed dispensing chute of a seed planter comprising a body means formed of electrical insulating material, said body means having one side wall formed with an inside surface extending longitudinally obliquely downwardly toward and terminating short of the opposite side wall of said body means thereby forming a seed opening or outlet at the lower end portion of the unit, said body means including a bottom end surface extending from the bottom of said obliquely extending inside surface toward the outside surface of said one side wall, a resilient switch blade attached at one end of said bottom end surface and extending at its opposite end across said seed opening and adapted to be engaged and flexed downwardly by a seed falling through the unit for discharge through said seed opening, an electric current terminal exposed on said bottom end surface for electrical engagement by said blade, said blade being biased toward and for engagement with said terminal, said blade also engaging the lower end of said opposite side wall while being in contact with said terminal, and electric current conducting wire means electrically connected with and leading from said terminal and said switch blade respectively for connection in an electric circuit.

12. A seed planter having a seed feeding means and a dispensing chute positioned to receive seed from the feeding means, a switch carrying unit supported by said dispensing chute, a switch supported by said unit, an electric circuitry having a source of electric potential, said switch being connected in said circuitry and including a pair of electric terminals, said switch including a movable blade for electrically connecting and disconnecting said terminals, said blade being positioned in the path of and struck by successive seeds falling through the dispensing chute and moved by the falling seeds to control the current flow in the circuitry, an electric current operated visual indicating means and a separate numerical indicating means in said circuitry actuated by said switch to provide both a visual and a numerical indication of the passage of a seed through said unit.

13. Apparatus as defined in claim 12 wherein said visual indicating means comprises lamp means, said lamp means being connected in said circuitry so as to be normally non-illuminated, said switch means being connected with said lamp means so as to cause the lamp means to be illuminated upon actuation of said switch means by a falling seed.

14. Apparatus as defined in claim 13 wherein said switch means is normally closed when said lamp means is non-illuminated, a falling seed being adapted to open said switch means upon contact with said blade to cause illumination of said lamp means.

References Cited

UNITED STATES PATENTS

| | | | |
|---|---|---|---|
| 2,210,990 | 8/1940 | Tuft et al. | 111—51 |
| 2,914,246 | 11/1959 | Beamish | 235—98 |
| 3,185,118 | 5/1965 | Greene | 111—51 |

STEPHEN J. TOMSKY, *Primary Examiner.*